United States Patent [19]
Sekiguchi

[11] Patent Number: 4,831,572
[45] Date of Patent: May 16, 1989

[54] POLYNOMIAL VECTOR ARITHMETIC OPERATION CONTROL SYSTEM

[75] Inventor: Sunao Sekiguchi, Tokyo, Japan

[73] Assignee: NEC Corporation, Tokyo, Japan

[21] Appl. No.: 67,957

[22] Filed: Jun. 30, 1987

[30] Foreign Application Priority Data

Jun. 30, 1986 [JP] Japan .................. 61-152912

[51] Int. Cl.⁴ .............................................. G06F 7/00
[52] U.S. Cl. .................. 364/715.01; 364/200
[58] Field of Search .......... 364/715, 736, 200; 366/715.01

[56] References Cited
U.S. PATENT DOCUMENTS 3,764,988 10/1973 Onishi ................................ 364/200
3,889,242 6/1975 Malmer, Jr. ....................... 364/200
4,095,278 6/1978 Kihara ............................... 364/900
4,697,250 9/1987 Lee et al. .......................... 364/900

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

A system for controlling polynomial arithmetic operations of a vector arithmetic processor capable of executing the arithmetic operations independently of a central processing unit (CPU), includes, in the vector arithmetic processor, a circuit for modifying an instruction code supplied from the CPU on the basis of a signal representing that the instruction supplied from the CPU is a vector arithmetic instruction and a signal for commanding switching of the instruction code from the CPU, and an instruction decoder addressed in response to an output from the modification circuit to output an instruction word to an arithmetic unit.

5 Claims, 4 Drawing Sheets

POLYNOMIAL VECTOR ARITHMETIC OPERATION CONTROL SYSTEM

BACKGROUND OF THE INVENTION

The present invention relates to a polynomial vector arithmetic operation control system in a data processor.

A conventional arithmetic operation control system in a vector arithmetic processor under the control of a central processing unit (to be referred to as a CPU hereinafter) has a system configuration shown in FIG. 1.

The vector arithmetic processor includes one instruction code register 11, an instruction decoder 15 addressed by an instruction code set in the instruction code register 11, an instruction execution start command register 16 for generating a command representing the start of instruction execution of the vector arithmetic processor, an arithmetic control unit 17, and an arithmetic unit 18. The instruction is defined as a minimum unit of arithmetic operation executed by the vector arithmetic processor and is exemplified by an addition, a subtraction, a multiplication, and the like. The instruction is defined as an instruction code of a few bits. Information representing how the vector arithmetic processor is operated on the basis of the instruction code is recorded in the instruction decoder 15.

When a CPU (not shown) sets an instruction code in the instruction code register 11, the instruction execution start command register 16 is set. The instruction code is supplied to the instruction decoder 15 through a line 102 and is decoded thereby. The instruction decoder 15 sends a signal for an arithmetic operation to the arithmetic control unit 17 in response to the input instruction code. At the same time, the instruction execution start command register 16 sends an instruction execution start command signal to the arithmetic control unit 17, thereby operating the arithmetic unit 18.

In the conventional arithmetic operation control system described above, only one instruction code register 11 is used to directly address the instruction decoder 15. Accordingly, assume that one instruction (e.g., an addition) is repeatedly executed, this instruction is set in the instruction code register 11 once to repeat the corresponding arithmetic operation. However, if a polynomial vector arithmetic operation is performed wherein one result is obtained by using a plurality of instructions (e.g., a combination of multiplication and addition), the corresponding instruction codes must be alternately set in the instruction code register 11, resulting in inconvenience.

SUMMARY OF THE INVENTION

It is an object of the present invention to provide a vector arithmetic operation control system which eliminates the conventional drawbacks described above and does not require alternate instruction setting in an instruction code register even if a polynomial vector arithmetic operation is to be executed, thus increasing the vector arithmetic operation speed.

A system for controlling the arithmetic operation of a vector arithmetic processor capable of executing arithmetic operations independently of a CPU, comprises, in the vector arithmetic processor, an instruction code register for storing an instruction code supplied from the CPU, a first register for storing a signal representing whether the instruction code currently stored in the instruction code register requires switching, a second register for storing an instruction code switching signal resettable from the CPU, and a modification circuit means for modifying an output from the instruction code register on the basis of outputs from the first and second registers and for outputting a modified signal.

DETAILED DESCRIPTION OF THE PREFERRED EMBODIMENTS

Preferred embodiments of the present invention will be described in detail with reference to the accompanying drawings.

Figure 1:
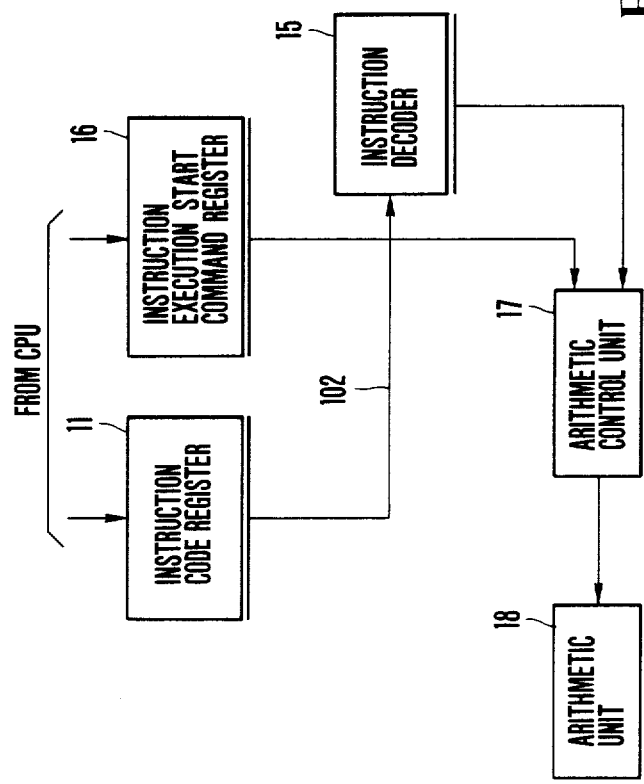
FIG. 1 is a block diagram showing a conventional system.
Figure 2:
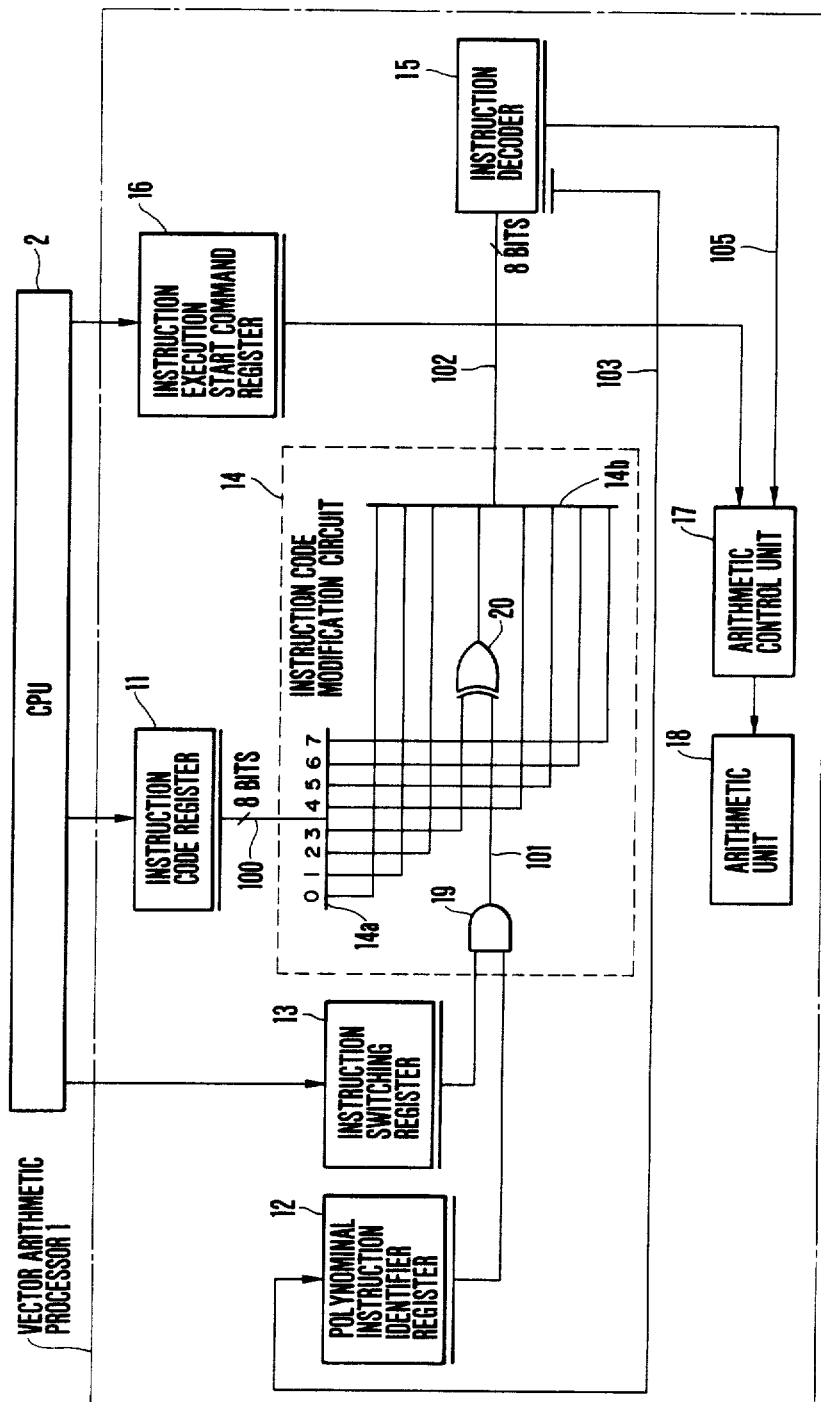
FIG. 2 is a block diagram showing an arrangement of an embodiment according to the present invention.

FIG. 2 is a block diagram of a polynomial vector arithmetic operation control system according to an embodiment of the present invention. In this system, a multiplication and an addition are performed to obtain a single result as follows:

$$A_i \leftarrow B_i + C_i \times D_i \quad (i = 1 \text{ to } n) \tag{1}$$

Referring to FIG. 2, a vector arithmetic processor 1 comprises an 8-bit (0 to 7) instruction code register 11 for storing an instruction code supplied from a CPU 2, a polynomial instruction identifier register 12 for storing a signal representing whether the instruction code supplied from an instruction decoder 15 and stored in the instruction code register 11 requires instruction code switching, and a 1-bit instruction switching register 13 for storing a signal representing which of the plurality of instructions is executed, i.e., a signal for designating bit inversion at the time of instruction switching. The processor 1 further comprises an instruction code modification circuit 14 for modifying an output from the instruction code register 11 in response to outputs from the polynomial instruction identifier register 12 and the instruction switching register 13, an instruction decoder 15 for decoding an output from the instruction code modification circuit 14, an instruction execution start command register 16 connected to the CPU 2, an arithmetic control unit 17 for receiving outputs from the instruction execution start register 16 and the instruction decoder 15, and an arithmetic unit 18 for executing an arithmetic operation under the control of the arithmetic control unit 17.

The instruction code modification circuit 14 comprises an AND gate 19 and an exclusive OR gate 20. The two input terminals of the AND gate 19 are respectively connected to the output terminals of the polynomial instruction identifier register 12 and the instruction switching register 13. An input terminal 14a of the instruction code modification circuit 14 is connected to an 8-bit (0 to 7) signal line 100. An output terminal 14b of the instruction code modification circuit 14 is connected to the input terminal of the instruction decoder 15 via an 8-bit line 102. In the instruction modification circuit 14, the output terminal of the AND gate 19 is connected to one input terminal of the exclusive OR gate 20. The other input terminal of the exclusive OR gate 20 is connected to bit position 3 in the 8-bit line. The remaining seven bit positions of the input terminal 14a and the output terminal of the exclusive OR gate 20 are connected to the output terminal 14b in the order named.

The operation of the system shown in FIG. 2 will be described below.

An instruction code comprises eight bits. Only bits 3 of the bits 0 to 7 of the multiplication and addition instruction codes in equation (1) differ from each other. However, the different bits are not limited to bits 3. In the vector arithmetic operation including the multiplication and addition instructions, the multiplication instruction is generally independent of the addition instruction. Logic "1" is set in the bit position for a polynomial vector arithmetic operation in an instruction word of each of the multiplication and addition instructions. The instruction word is stored in the instruction decoder 15.

In operation, the multiplication instruction is first set in the instruction code register 11 under the control of the CPU 2. At the same time, the CPU 2 sets the instruction execution start command register 16. At an initial instruction code setting, the polynomial instruction identifier register 12 and the instruction switching register 13 are reset under the control of the CPU 2. Both outputs from the identifier register 12 and the register 13 are thus set at logic "0". Therefore, the instruction code set in the instruction code register 11 serves as address data for the instruction decoder 15 via the signal line 102. The instruction decoder 15 decodes the instruction code and sends an instruction word corresponding to the input address signal to the arithmetic control unit 17, thereby initiating execution of the instruction. The polynomial vector arithmetic instruction bit of logic "1" in the instruction word is supplied from the instruction decoder 15 to the polynomial instruction identifier register 12 through a signal line 103. The bit of logic "1" is set in the polynomial instruction identifier register 12.

When the multiplication instruction command for the vector arithmetic processor 1 is executed, the CPU 2 supplies the next (addition) instruction to the vector arithmetic processor 1. In this state, the instruction execution start register 16 is set and the instruction switching register 13 is inverted and outputs a signal of logic "1". An output from the AND gate 19 is set at logic "1", and one input to the exclusive OR gate 20 is et at logic "1" through the signal line 101. Bit 3 of the output of the instruction code register 11 is inverted at the output of the exclusive OR gate 20. Therefore, the addition instruction code appears on the signal line 102. The instruction decoder 15 supplies the addition instruction word to the arithmetic control unit 17, thereby executing the addition instruction.

When the multiplication instruction is to be executed, the CPU 2 sends a command for the start of instruction execution to the vector arithmetic processor 1. The instruction switching register 13 is inverted again to generate a signal of logic "0". The instruction on the signal line 102 is changed to the multiplication instruction.

Figure 3:
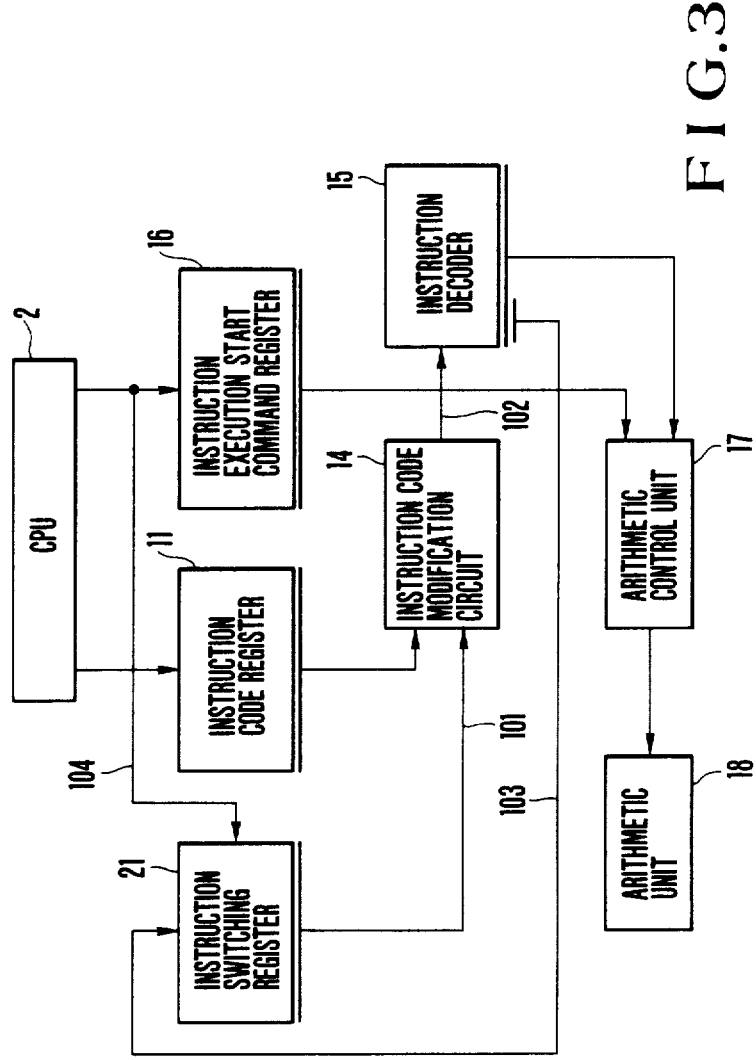
FIG. 3 is a block diagram showing another embodiment of the present invention.

FIG. 3 is a block diagram showing another embodiment of the present invention. The same reference numerals as in FIG. 2 denote the same parts in FIG. 3.

Referring to FIG. 3, the polynomial instruction identifier register 12 and the AND gate 19 in FIG. 2 are omitted. A signal line 103 is connected to an instruction switching register 21, and an output from the instruction switching register 21 is connected to an instruction code change circuit 14 through a signal line 101. An instruction execution start command is supplied from a CPU 2 to the instruction switching register 21 through a line 104.

The operation of the arrangement shown in FIG. 3 will be described below.

A multiplication instruction is set in an instruction code register 11. In this state, since the instruction switching register 21 is reset to "0", the multiplication instruction code appears on the signal line 102 and the multiplication instruction is executed, as described above. A polynomial vector arithmetic instruction bit of the multiplication instruction word output from an instruction decoder 15 is set at logic "1", and thus the signal line 103 is set at logic "1". Subsequently, when the CPU 2 outputs a signal representing initiation of addition instruction execution, an instruction execution start register 16 is set and the instruction switching register 21 is inverted because both the input signals from the signal lines 103 and 104 are set at logic "1". Therefore, the addition instruction code appears on the signal line 102 upon operation of the instruction code change circuit 14 in the same manner as described above. The polynomial vector arithmetic instruction bit of the instruction word output from the instruction decoder 15 is set at logic "1", and then the signal line 103 is set at logic "1". When the multiplication instruction start command is input, the instruction switching register 21 is inverted again to cause the multiplication instruction to appear on the signal line 102.

A means for recognizing polynomial vector arithmetic operation is the polynomial vector arithmetic instruction bit in the instruction word generated by the instruction decoder 15.

Figure 4:
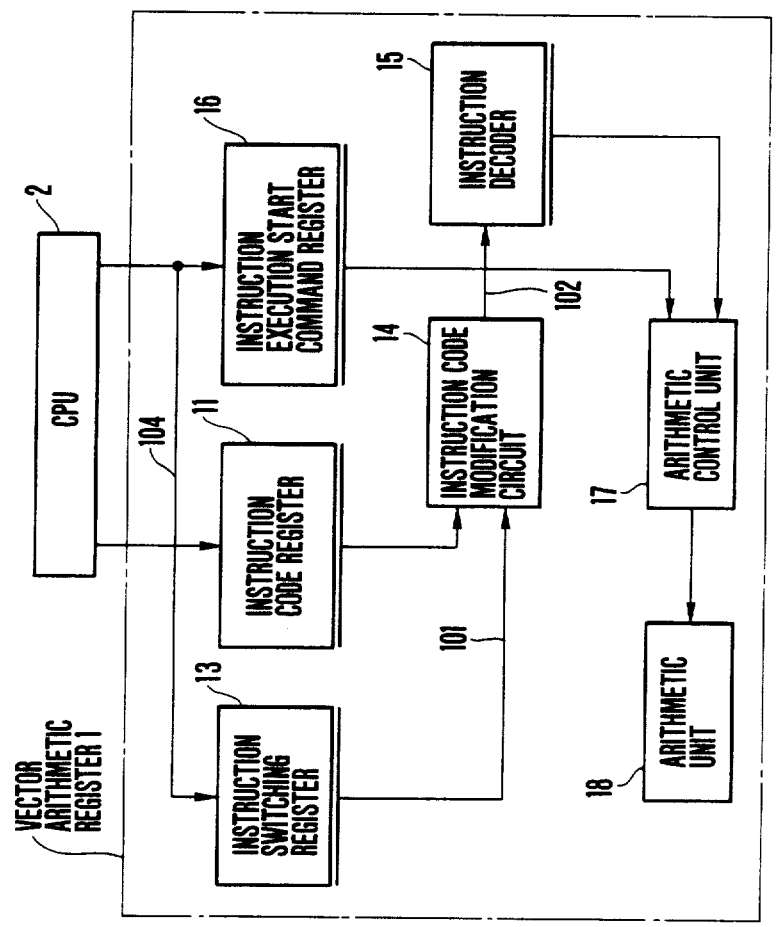
FIG. 4 is a block diagram showing still another embodiment of the present invention.

FIG. 4 is a block diagram showing still another embodiment of the present invention. The same reference numerals as in FIG. 3 denote the same parts in FIG. 4. The signal line 103 between the instruction decoder 15 and the instruction switching register 13 in FIG. 3 is omitted. A signal representing execution of the polynomial vector arithmetic operation is not output from an instruction decoder.

In this embodiment, a CPU 2 recognizes that the polynomial vector arithmetic operation is being performed. An instruction execution start command is supplied from the CPU 2 to a vector arithmetic processor 1 using a specific command signal. This command signal sets an instruction execution start command register 16, and an output from an instruction switching register 13 is inverted. In this case, a polynomial vector arithmetic instruction bit is not required in the instruction decoder 15, and thus the instruction decoder 15 can be commonly used for the addition and multiplication instructions. The instruction execution start command which does not require instruction switching can be instructed by another specific command signal for inhibiting inversion of the instruction switching register 13.

According to the present invention as described above, the instruction code is modified or changed by the polynomial instruction register or identifier for storing a signal representing that the currently executed instruction is a polynomial vector arithmetic instruction and the instruction switching register. The different instruction codes need not be set in the instruction code register whenever they are executed, thus performing high-speed polynomial vector arithmetic operations.

What is claimed is:

1. A system for controlling arithmetic operation of a vector arithmetic processor capable of executing arithmetic operations independently of a CPU, comprising, in said vector arithmetic processor;

an instruction code register for storing an instruction code supplied from said CPU, means for determining whether the instruction code currently stored in said instruction code register requires instruction code switching, and storing a signal representing a determination result, a register for storing an instruction code switching signal resettable from said CPU, and modification circuit means for modifying an output form said instruction code register on the basis of outputs from said determining means and said register and for outputting a modified signal.

2. A system according to claim 1, wherein said instruction code modification circuit comprises means for modifying at least one bit of an n-bit instruction input from said instruction code register on the basis of the outputs from said first an second registers and for outputting a modified instruction code.

3. A system for controlling arithmetic operation of a vector arithmetic processor capable of executing arithmetic operations independently of a CPU, comprising, in said vector arithmetic processor, an instruction code register for storing an instruction code supplied from said CPU, a first register for storing a signal representing whether the instruction code currently stored in said instruction code register requires switching, a second register for storing an instruction code switching signal resettable from said CPU, modification circuit means for modifying an output from said instruction code register on the basis of outputs from said first and second registers and for outputting a modified signal, an instruction decoder addressed in response to an output from said instruction code modification circuit means to output an instruction word, some bits of the instruction word being supplied to said first register, as the signal to be stored therein and means for executing an arithmetic operation on the basis of the instruction code output from said instruction decoder.

4. A system for controlling arithmetic operation of a vector arithmetic processor capable of executing arithmetic operations independently of a CPU, comprising, in said vector arithmetic processor;

an instruction code register for storing an instruction code supplied from said CPU, register means for inputting a first signal representing that the instruction currently stored in the instruction code register is a polynomial vector arithmetic instruction and a second signal for commanding initiation of arithmetic operation of said vector arithmetic processor from said CPU to generate a third signal based on the first signal and the second signal, instruction code modification circuit means for modifying an output from said instruction code register on the basis of the third signal, an instruction decoder addressed in response to an output from said instruction code modification circuit means to output the instruction code and to supply some bits of the instruction word as the first signal to said register means, and arithmetic means for executing an arithmetic operation on the basis of the instruction word output from said instruction decoder.

5. A system for controlling arithmetic operation of a vector arithmetic processor capable of executing arithmetic operations independently of a CPU, comprising, in said vector arithmetic processor, an instruction code register for storing an instruction code supplied from said CPU, register means for receiving an arithmetic operation start signal supplied from said CPU to said vector arithmetic processor, the arithmetic operation start signal including a signal representing that the instruction stored in said instruction code register is a polynomial vector arithmetic instruction, and for outputting a signal, instruction code modification circuit means for modifying an output from said instruction code register in response to the signal output from said register means, an instruction decoder addressed in response to an output from said instruction code modification circuit means to output an instruction word, and arithmetic means for executing an arithmetic operation on the basis of the instruction word output from said instruction decoder.

* * * * *